May 21, 1968 C. R. POLCER 3,383,835
JAR CAPPING MACHINE
Filed April 6, 1966
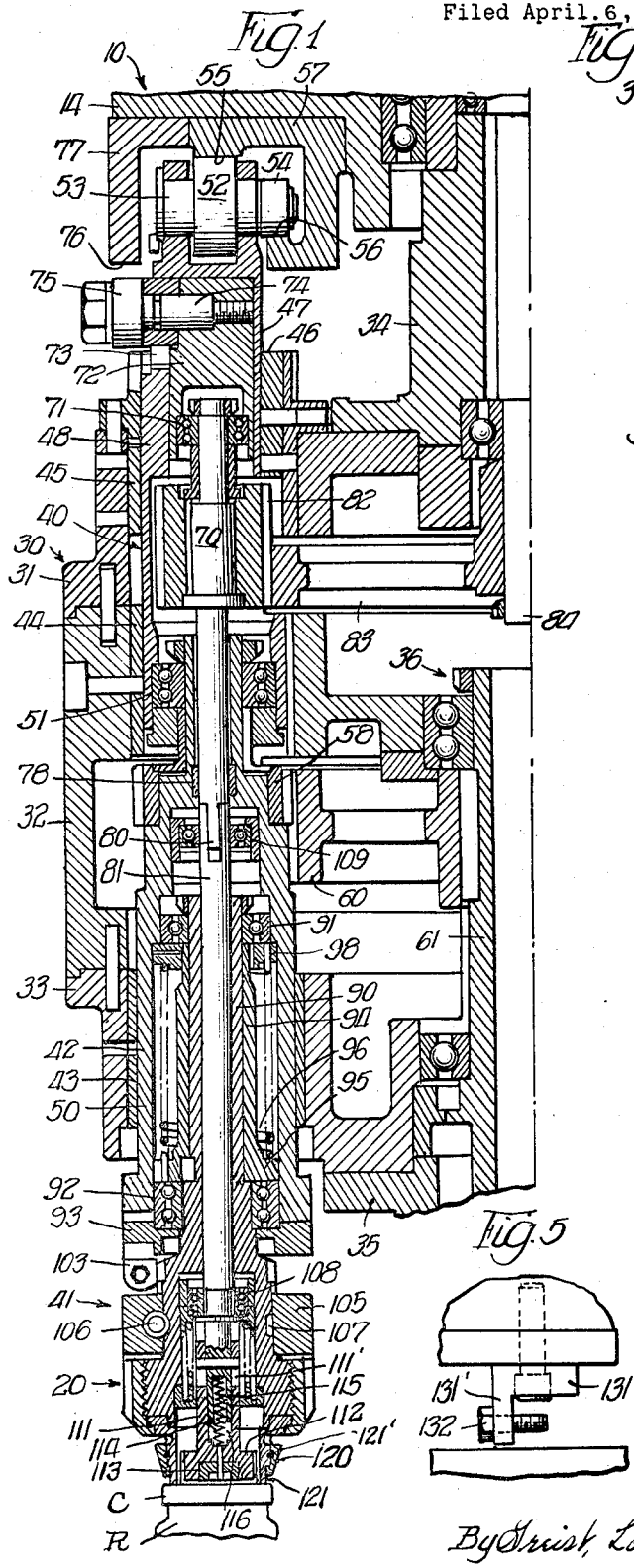
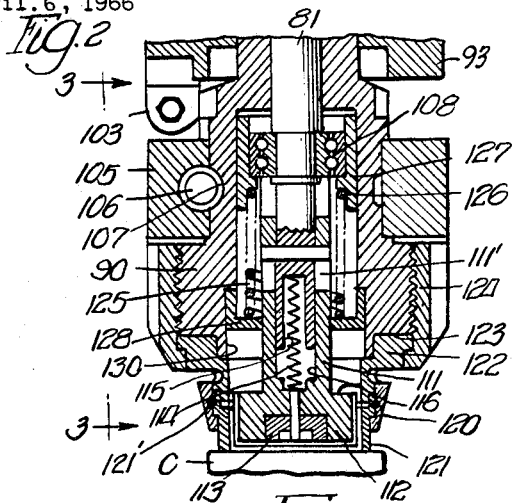
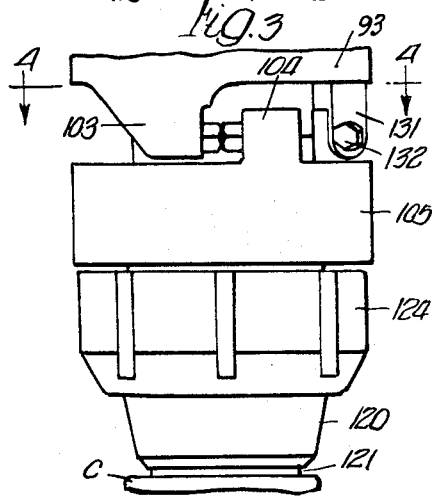
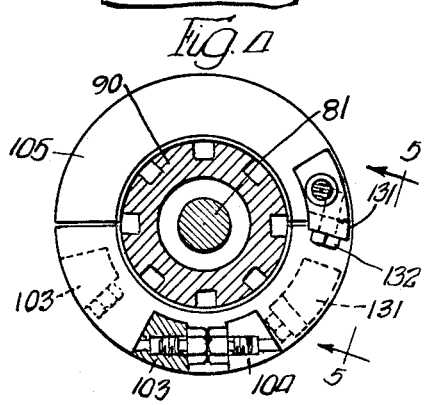
Inventor
Charles R. Polcer,
By Strist, Lockwood, Munnavalt & Dewy
Attys.

United States Patent Office 3,383,835
Patented May 21, 1968

3,383,835
JAR CAPPING MACHINE
Charles R. Polcer, Walnut Creek, Calif., assignor to Continental Can Company, Inc., New York, N.Y., a corporation of New York
Filed Apr. 6, 1966, Ser. No. 540,653
6 Claims. (Cl. 53—331.5)

This invention relates to machinery for applying closures to containers and is more particularly concerned with improvements in a machine for applying closure caps of the screw-on or turn-on type to the tops of jars or like containers and for turning the caps down into sealing engagement on the jars.

In the commercial processing and packaging of food products and other commodities, glass jars and similar containers with screw threaded closure caps are commonly employed and various types of cap applying and closing machinery have been developed. In one type of machine which has been employed the filled containers are delivered to a turret and the caps are applied and rotated into screwed down sealing position by a plurality of cap applying and sealing heads or spindle assemblies which are mounted on the turret and which travel with the jars as they move in a circular path below the same. One such machine is disclosed in the co-pending application of Herbert W. Volker and James A. McDonald, Ser. No. 253,895, filed Jan. 25, 1963, now Patent No. 3,253,388. This machine is characterized by a cap applying and turning head or spindle assembly having two independently driven spindles. The caps are delivered initially to one of the spindles which is rotated at high speeds for placing the cap on the jar and turning the same into fully engaged position and with the other spindle being operated at a relatively slow speed so as to engage the cap and tighten it to a pre-set torque while the jar is held on the turret against rotation during the operation of the spindles. The slow speed spindle in this machine includes a torsion spring which resists the movement of the spindle in the direction to turn down the cap and which is adjustable so as to control the amount of torque exerted and thereby vary the force applied by the spindle in turning down the cap so that under normal conditions the caps are applied to successive jars with a uniform torque. However, in the operation of this machine it has been found that due to variations in conditions such as irregularities in glass finish and specifications, cap manufacturing tolerances, sealing compound thickness and placement, and the like, some balky caps are applied which do not meet the minimum requirements for cap tightness. The failure of the machine to successfully turn down such balky caps to the desired tightness has limited to some extent the usefulness of the machine and an object of this invention is to provide an improved machine of this type having a spindle head assembly which will operate so as to insure that each cap on each jar is turned down to an acceptable tightness when it leaves the machine.

It is a more specific object of the invention to provide in a cap applying and tightening machine of the type having a rotary turret and a plurality of cap applying and tightening spindle heads an improved spindle assembly which includes a torque spring and a mechanism for limiting the amount of spring windup so as to insure that at least a minimum acceptable cap tightness results from the operation of the spindle.

It is another object of the invention to provide in a machine having a spindle head assembly which is characterized by a spindle driven at high speed for initially applying a cap and a separately driven slow speed spindle for tightening the cap, with the slow speed spindle including a torque spring for controlling the tightening force, the improvement which comprises a stop member for limiting the amount of torque spring windup so that the slow speed spindle will normally turn down each successive cap to the desired tightness and any balky caps encountered due to irregularities in glass finish, cap tolerances or the like, sometimes encountered in commercial processing and capping operations will be applied to the jars with at least a minimum acceptable tightness.

These and other objects and advantages of the invention will be apparent from a consideration of the cap applying and tightening apparatus which is shown by way of illustration in the accompanying drawings wherein:

FIGURE 1 is a partial vertical section through a cap applying head of a capping machine with the section being taken on a plane extending through a cap applying spindle assembly which has incorporated therein mechanism embodying the present invention;

FIGURE 2 is a fragmentary sectional view, to a larger scale, showing the lower cap engaging end of the spindle assembly of FIGURE 1;

FIGURE 3 is an elevational view taken on the line 3—3 of FIGURE 2;

FIGURE 4 is a cross section taken on the line 4—4 of FIGURE 3; and

FIGURE 5 is a fragmentary elevation taken on the line 5—5 of FIGURE 4.

The mechanism which is illustrated in the drawings constitutes a part of a capping machine which is adapted to be employed in a canning or processing line and which is designed to apply screw-on or turn-on type closure caps C to containers or receptacles, such as glass jars R, which have been filled with a product and delivered to a traveling conveyor constituting the jar infeed apparatus for the capping machine.

The capping machine, except for the improvement hereinafter described, may be constructed according to the disclosure in co-pending application Ser. No. 263,895, now Patent No. 3,253,388 to which reference may be had for details not hereinafter described. The capping machine comprises an upright supporting frame in which there is mounted a jar carrying turret, rotatable on a vertical axis and disposed below a cap applying head 10 which is suspended from a top driving housing 14 with the latter being mounted in vertically adjustable position on the supporting frame. The supporting frame also carries a cap feeding and delivering apparatus at one side of the jar supporting turret and at the proper level for delivering the caps C from a supply magazine or chute to the applying head 10 while the jars R are delivered to the supporting turret by an infeed conveyor and are aligned for application of the caps to the jars as they are transferred from the infeed conveyor to the jar supporting turret. The caps C are applied to the jars R, tightened during rotation of the turret and the head 10, and thereafter delivered to a discharge mechanism which removes them from the machine.

The capping head 10 carries a plurality of cap applying spindle assemblies 20 which are moved by rotation of the head 10 to a make-up point where each successive spindle assembly 20 is in vertical alignment with a jar R which has been advanced by the infeed conveyor into position on the jar supporting turret. The caps C are fed to the make-up point where they are delivered beneath successive spindle assemblies 20 carried on the cap applying head 10, and each successive cap C is picked up by a spindle assembly 20 as it advances in vertical alignment with a jar on the turret beneath the same.

The spindle assemblies 20 are mounted in peripherally spaced relation on a spindle supporting housing 30 which is of generally cylindrical shape and which is suspended in rotatable relation from the top drive housing 14.

The spindle housing 30 is formed in three sections 31, 32 and 33 which are connected together so as to operate as a unit. The uppermost section 31 is secured on a supporting sleeve 34 which is rotatably mounted in the top drive housing 14 and constitutes part of the drive for the head 10. The lowermost section 33 is secured to a connecting sleeve 35 aligned with the upper end of a drive shaft assembly (not shown) in the turret structure. The three housing sections 31, 32 and 33 also function as a drive coupling between the main drive in the top housing 14 and the vertical drive shaft assembly 36 which drives the turret and associated mechanisms.

Each spindle assembly 20 is mounted for vertical movement in vertically aligned bores in the three section housing 30. Each assembly 20 comprises an upper sub-assembly 40 and a lower sub-assembly 41, the latter having its upper portion housed in the lower portion of the sub-assembly 40 with its lower end projecting below the same. The upper spindle sub-assembly 40 comprises an elongate housing 42 having a dimension in the vertical direction somewhat greater than the corresponding dimension of the housing 30. It is supported in vertical sliding relation in the sleeve bearings 43, 44 and 45 which are secured in the three sections of the housing 30. The uppermost bearing sleeve 45 is provided with a key forming slide member 46 which engages with the co-operating flat surface 47 on the upper end of the spindle housing 42 to hold the housing against movement about its vertical axis while permitting vertical reciprocation thereof. The spindle housing 42 comprises two parts or sections 48 and 50 which are connected for relative rotation about their vertical axis by a bearing forming coupling 51. The upper section 48 of the spindle housing 42 carries a bearing roller 52 on a cross pin 53 mounted in the bifurcated top forming portion of section 48. A cam roller 54 is mounted on the inner end of the pin 53. The bearing roller 52 engages with the downwardly facing cam track 55 and the cam roller 54 engages with the upwardly facing cam track 56 on a vertical movement controlling cam ring 57 mounted on the top housing 14 so as to control the vertical movement of the upper spindle housing 42 and the entire spindle assembly 20. The lower section 50 of the spindle housing 42 constitutes the upper portion of a slow speed, cap turning or tightening spindle and is provided, immediately below the coupling 51, with a gear 58 for driving connection with the gear 60 which is keyed to a slow speed vertical drive shaft member 61, the latter being journaled in the two lower sections 32 and 33 of the housing 30 and constituting the upper section of the main drive shaft assembly 36. In the operative or working position of the head 10 the slow speed spindle drive shaft member 61 is coupled to an inner drive shaft member (not shown) which through a shaft and gear connection is driven by rotation of the housing 30. The upper section 48 of the spindle housing 42 has an inner vertically disposed cap applying, high speed spindle shaft 70 mounted therein which is supported at its upper end by the bearing coupling 71 in slide block 72 so as to move vertically with the slide block 72 in the upper end of the housing section 48. The housing section 48 has an axially extending slot 73 and a pin 74 extends laterally through the slot 73 and carries a cam roller 75 which is positioned for engagement with a downwardly facing cam surface 76 on the cam ring 77 which controls the vertical movement of the slide block 72 and the shaft 70. The high speed spindle shaft 70 is supported at its lower end in a sleeve bearing 78 and is coupled at 80 to the upper end of an inner high speed spindle shaft 81, the latter being mounted in the lower spindle sub-assembly 41 and constituting an extension of the high speed spindle shaft 70. The high speed spindle shaft 70 and the upper section 48 of the housing 42 carries a gear 82 which is driven by the gear 83 mounted on the lower end of a high speed spindle drive shaft 84 in the uppermost section 31 of the housing 30.

The high speed spindle drive shaft 84 is connected in driven relation with the main drive in the top drive housing 14.

The spindle sub-assembly 41 has its uppermost portion housed in the lower portion 50 of the spindle sub-assembly 40. It comprises an inner sleeve member 90, forming a housing for the high speed spindle shaft 81, which member 90 is mounted within the housing section 50 by means of upper and lower bearing members 91 and 92 and is retained therein by the lower bearing clamp 93 which is secured to the lower end of the housing section 50. An outer sleeve 94 extends between the bearings 91 and 92, is keyed to the inner sleeve 90 and has a peripheral flange 95 at its lower end forming a seat for a torque spring 96, the latter having its lower end secured to the flange 95. The spring 96 extends to an upper retainer ring 98 which is keyed to the housing section 50, and the end of the spring 96 is secured to the ring 98 so that rotation of the sleeve 90 relative to the housing section 50 is resisted by the torque spring 96. Movement of the sleeve 90 about its axis relative to the housing section 50 is limited by engagement of a depending lug or stop member 103 on the bearing clamping ring 93 and an upstanding lug or stop member 104 adjacent the lower end of the sleeve 90. The stop lugs 103 and 104 are provided with headed screws which form replaceable bumper members. The stop lug 104 is upstanding from a ring member 105 which is adjustable circumferentially on the sleeve 90 by means of a worm 106 mounted in the ring member 105 and a tooth portion 107 on the sleeve so as to adjust the amount of torque or resistance exerted by the torque spring 96.

The high speed spindle shaft 81 is supported at its lower and upper ends by bearings 108 and 109 and receives in sliding relation on its lower end, which is of reduced cross section, the hollow stem portion 111 of a cap pick-up head 112, the latter having a bayonet slot 111′, which hooks over a cross pin on the shaft 81. The cap pick-up head 112 has a magnet 113 mounted in its bottom face and is urged in a downward direction away from the end of the shaft 81 by a compression spring 114 seated in a recess 115 in the end of the shaft 81 and a recess 116 in the head 112. The pick-up head 112 is movable within a torque ring assembly 120 which carries a cap engaging pad 121 of ring-like form backed up by a spring washer 121′. The torque ring assembly 120 has a flange 122 seated in a peripheral recess 123 in the lower end of the sleeve 90 and held therein by the cap member 124 which is secured in threaded relation on the end of the sleeve 90. A compression spring 125 is seated at one end in a recess 126 in the bearing housing 127 at the bottom end of the shaft 81 and has its other end seated in a retainer member 128 in an enlarged section 130 in the bore of the lower end of the sleeve 90 so as to urge the bearing housing 127 upwardly to hold the shaft 81 normally in the uppermost position.

A stop member in the form of an angle bracket 131 is secured on the bottom face of the bearing clamp 93 with a stop forming depending leg 131′ having a headed screw 132 forming a replaceable bumper member. The stop member 131 is in the path of the upstanding stop lug 104 on the retainer ring 105 and limits the amount of torque spring windup. The stop member 131 is positioned normally a predetermined distance back of the stop lug 104 so that if for any reason the rotation of the cap to turn the same down into the desired tightness on the mouth of the jar is resisted beyond a predetermined normal degree the stop member 131 will be brought into engagement with the back side of the stop lug 104 and apply direct rotational force to the torque ring assembly for the remaining portion of the capping cycle and thus assure that the cap is turned down the amount necessary for acceptable tightness on the jar.

The operation of the head, except for the final tightening of any balky caps in accordance with the present invention is the same as described in application Ser. No. 253,895, now Patent No. 3,253,388. A cap C is delivered to the pick-up head 112 and held by magnet 113 on the end of the high speed inner spindle which spins the same onto the top of the jar R as the jar is carried in alignment beneath the head 10 on the supporting jar turret. The slow speed outer spindle assembly is lowered to frictionally engage the pad 121 with the top of the cap, and slow speed rotation of the housing 42, which carries the friction pad 121, turns the cap tight while the assembled cap and jar advances around the supporting turret. The operation of the torque spring 96 in each spindle assembly normally insures that each cap is turned tight with the same amount of torque. When there is more than the normal amount of resistance to the turning of the cap by rotation of the housing 41 so that the torque spring does not exert sufficient force to rotate the cap the proper amount, the windup of the torque spring 96 will be limited by the engagement of the stop lug 104 with the limit stop 131 and direct rotational force will be applied to the torque ring for the remaining portion of the capping cycle so as to turn down the cap on the mouth of the jar to at least a minimum acceptable tightness.

While particular materials and specific details of construction have been referred to in describing the illustrated apparatus, it will be understood that other materials and equivalent structural details may be resorted to within the spirit of the invention.

I claim:

1. In a container capping machine having a container supporting turret mounted on an upright frame for rotation about a vertical axis, and a cap applying head mounted above said turrent for rotation on a vertical axis aligned with the vertical axis of the turret which cap applying head has spindle assemblies mounted in spaced relation about the periphery thereof which are vertically reciprocable and in vertical alignment with containers supported on the turret, each of said spindle assemblies having two shaft sections which are rotatable relative to each other about a common axis and which are connected by a torque spring, said shaft sections being adapted to be positioned relative to each other with a predetermined load on said torque spring, means on each spindle assembly for releasably gripping a cap, means for lowering each spindle assembly so as to pick up a cap and position it onto a container, means for rotating each spindle assembly so as to rapidly turn the cap onto the container and normally tighten the cap with a predetermined torque through rotation of said shaft sections in a direction to increase the load on said torque spring to a predetermined amount, said shaft sections having adjustably mounted abutment members thereon which co-operate to hold said shaft sections against reverse rotation sufficient to relieve the predetermined load on the torque spring, said spindle assemblies being rotated in tightening the caps so that said shaft sections turn about their common axis relative to each other in the direction to increase the load on the connecting torque spring, said abutment members being effective to limit the reverse rotation of said shaft sections when said shaft sections are raised free of the turned on caps whereby caps are normally seated on the containers with a predetermined torque and a limit stop member on the shaft section and in the path of the abutment member on the other shaft section for limiting reverse relative rotation of the shaft sections beyond a predetermined point so as to overcome abnormal resistance to turning of the cap and insure that each cap is turned down to at least the minimum acceptable tightness.

2. In a machine for applying caps to the threaded mouths of jar-like containers wherein a turret is supported on an upright frame for rotation about a vertical axis with container supporting assemblies mounted about the periphery thereof and a cap applying head is supported above the turret for rotation on a vertical axis aligned with the axis of the turret which cap applying head has cap placing and turning spindle assemblies spaced about the periphery thereof and in vertical alignment with the container supporting assemblies, the improvement which comprises inner and outer spindles in each of said spindle assemblies, each of said spindles having means for gripping a cap, means for reciprocating the spindles vertically so as to lower caps fed to the spindle assemblies onto the containers fed to the turret, means for rotating the inner and outer spindles to turn the caps onto the containers and to tighten the caps and means associated with the outer spindle for normally limiting the turning force to a pre-set amount so that the caps are seated onto the containers with a predetermined torque, and means for increasing the torque when there is sufficient resistance to turning of the cap to prevent the turning thereof by rotation of the outer spindle to a predetermined sealing position so as to insure that each cap will be turned to the desired sealing position.

3. In a machine for applying caps to the threaded mouths of jar-like containers wherein a turret is mounted on an upright frame for rotation about a vertical axis with a plurality of container supporting assemblies spaced about the periphery thereof and a cap applying head is suspended above said turret for rotation on a vertical axis aligned with the axis of rotation of said turret which cap applying head has spindle assemblies spaced about the periphery thereof in accordance with the spacing of the container supporting assemblies, said spindle assemblies being vertically movable and having high speed cap applying spindle members and slow speed cap tightening spindle members which cap tightening members are telescoped and mounted for rotation relative to each other about a common vertical axis, a torsion spring connected at its opposite ends to said telescoped members, said telescoped members being initially rotated to a predetermined relationship so as to preload said torsion spring and co-operating stop members on said telescoped members which are pre-set so as to limit the rotation of said telescoped members in the direction to reduce the load on said torsion spring beyond a predetermined amount and a limit stop member on one of said telescoped members in the path of the pre-set stop member on the other telescoped member so as to prevent relative rotation of said telescoped members in the noncap turning direction beyond a predetermined point when there is greater than normal resistance to the turning of the cap in the direction to seal the same onto the container.

4. In a machine as recited in claim 3, and said stop members being spaced relative to each other so as to prevent unwinding of said torsion spring beyond a predetermined limit and to increase the torque applied in turning on a cap beyond the normal amount when there is more than a normal amount of resistance to the turning of the cap, thereby insuring that each cap will be turned at least to a minimum acceptable tightness on the associated container.

5. In a machine for applying caps to the threaded mouths of jar-like containers, comprising a turret mounted for rotation about a vertical axis, said turret having a plurality of container supporting assemblies mounted about the periphery thereof, a cap applying head suspended above said turret for rotation on a vertical axis aligned with the axis of rotation of said turret, said cap applying head having spindle assemblies mounted thereon which are spaced in accordance with the spacing of the container supporting assemblies, means for rotating said head and said turret with the spindle assemblies vertically aligned with containers on said supporting assemblies, said spindle assemblies being vertically movable and having telescoped shaft members which are rotatable relative to each other about a common vertical axis, one of said shaft members having a torsion producing means connecting two relatively rotatable shaft sections, means on the lower end of one of said shaft members for releasably holding a cap, means on the lower end of one of said shaft sections for frictionally engaging the top surface of the cap, means for lowering the shaft members in timed relation to place a cap on a container and turn it tight, drive means for rotating the cap holding shaft member at a relatively high speed when it is lowered, so as to rapidly spin the cap held thereon onto the container, drive means for rotating the shaft having the torsion producing means at a relatively slow speed when it is lowered for slowly tightening the cap on the container with a predetermined torque, cooperating stop members mounted on the relatively rotatable shaft sections of said one shaft member for limiting the relative rotation thereof in one direction beyond a pre-set amount so that abnormal resistance to turning of the cap will be overcome by positive turning of the shaft sections.

6. In a machine as recited in claim 5, and said torsion producing means comprising a torsion spring connected at opposite ends to the two shaft sections.

References Cited

UNITED STATES PATENTS

| | | | |
|---|---|---|---|
| 3,031,822 | 5/1962 | Dimond | 53—317 |
| 3,253,388 | 5/1966 | Volker et al. | 53—331.5 X |
| 3,303,633 | 2/1967 | Wilhere | 53—317 X |

WILLIAM W. DYER, JR., *Primary Examiner.*

R. L. FARRIS, *Assistant Examiner.*